US008740706B2

(12) United States Patent
Klein et al.

(10) Patent No.: US 8,740,706 B2

(45) Date of Patent: Jun. 3, 2014

(54) GAMING CONSOLE HAVING MOVABLE SCREEN

(75) Inventors: Caprice Klein, Graz (AT); Günter Brand, Graz (AT); Lukas Angermayer, Graz (AT); Martin Oswald, Stefan (AT); Stefan Keilwert, Laβnitzhöhe (AT); August Moser, Frauental (AT)

(73) Assignee: Spielo International Canada ULC, Moncton, NB (CA)

( * ) Notice: Subject to any disclaimer, the term of this patent is extended or adjusted under 35 U.S.C. 154(b) by 95 days.

(21) Appl. No.: 13/281,353

(22) Filed: Oct. 25, 2011

(65) Prior Publication Data

US 2013/0102390 A1 Apr. 25, 2013

(51) Int. Cl.

*A63F 9/24* (2006.01)
*A63F 13/00* (2014.01)
*G06F 17/00* (2006.01)
*G06F 19/00* (2011.01)

(52) U.S. Cl.

USPC .................... 463/37; 463/36; 463/38; 463/46

(58) Field of Classification Search

USPC ........................................................ 463/37

See application file for complete search history.

(56) References Cited

U.S. PATENT DOCUMENTS

| | | | | |
|---|---|---|---|---|
| 5,618,232 | A * | 4/1997 | Martin | 463/25 |
| 7,552,402 | B2 * | 6/2009 | Bilow | 715/862 |
| 2003/0060270 | A1 * | 3/2003 | Binkley et al. | 463/20 |
| 2005/0227750 | A1 | 10/2005 | Brase et al. | |
| 2009/0005165 | A1 * | 1/2009 | Arezina et al. | 463/37 |
| 2009/0264195 | A1 * | 10/2009 | Kompella | 463/31 |
| 2010/0035687 | A1 * | 2/2010 | Chou et al. | 463/37 |
| 2010/0120530 | A1 * | 5/2010 | Lesley et al. | 463/30 |
| 2010/0120536 | A1 * | 5/2010 | Chatellier et al. | 463/40 |
| 2012/0015732 | A1 * | 1/2012 | Takeda et al. | 463/39 |

FOREIGN PATENT DOCUMENTS

| | | | |
|---|---|---|---|
| EP | 1074954 | A1 | 2/2001 |
| JP | 2008281659 | A | 11/2008 |
| WO | 2007130691 | A2 | 11/2007 |
| WO | 2008027447 | A2 | 3/2008 |

OTHER PUBLICATIONS

PCT/IB2012/001845 International Search Report and Written Opinion, 9 pages.

* cited by examiner

*Primary Examiner* — Kevin Y Kim

(74) *Attorney, Agent, or Firm* — Patent Law Group LLP; Brian D Ogonowsky

(57) ABSTRACT

A gaming machine has a flat panel display screen that is pivotable over a range of angles to allow the player to tilt the screen to directly face the player. The screen also can be pulled toward the player for maximum comfort. The screen has user interface controls, such as part of a touch screen. The screen contains one or more accelerometers for detecting movement of the screen. The player grips the screen with both hands to control the game via movement of the screen (e.g., shaking, tilting, pushing in, or pulling out) and the touching of the user interface controls. The screen may include a vibrator for providing tactile sensations to the player. The screen allows a player to completely control a game, including wagering and carrying out the game, without releasing the screen from the player's two-handed grip.

19 Claims, 5 Drawing Sheets

GAMING CONSOLE HAVING MOVABLE SCREEN

FIELD OF THE INVENTION

This invention relates to gaming machines and, in particular, to a new type of movable video screen in the gaming machine.

BACKGROUND

Gaming machines, such as slot machines, are frequently video gaming machines where virtual reels are displayed on a fixed-angle flat panel screen. The screen may also display bonus games and any information needed to play the games. The screen may be a touch screen where the player can make selections by touching icons (e.g., virtual buttons) displayed on the screen. The screens are typically liquid crystal display (LCD) screens that have a narrow field of view due to the use of a brightness enhancement film laminated over the screen that concentrates the LCD light within a narrow angle directly in front of the screen to achieve sufficient brightness. Additionally, the construction of LCD screens, using polarizers, etc., prevents a wide vertical and horizontal field of view.

It is common for players to play the same gaming machine for hours at a time, and it would be convenient for the screen to be perfectly situated for optimal visibility for players of all sizes.

Further, if the screen is a touch screen, and the player plays for a long time, a non-optimal placement of the virtual buttons on the screen may cause the player discomfort.

Thus, what is needed is a more ergonomic gaming machine cabinet that makes it more comfortable and pleasing for the player to play for long periods of time.

Additionally, the conventional controls for gaming machines (e.g., buttons) do not provide enough flexibility to play more advanced interactive games. It would be desirable to enable the player to have more ways to control a game.

SUMMARY

A gaming machine console (or gaming machine) is disclosed where a flat panel display screen is pivotable over a range of angles to allow the player to tilt the screen to directly face the player. This optimizes the contrast and brightness of the display. The screen can be moved toward the player for maximum comfort. The screen also has user interface controls, such as part of a touch screen. In another embodiment, the height of the screen is also controllable.

The player grips the screen with both hands to control the game via movement of the screen (e.g., shaking, tilting, pushing in, or pulling out) and the touching of the user interface controls.

The screen, with all of its built-in control input and output devices, allows a player to completely control a game, including wagering and carrying out the game, without releasing the screen from the player's two-handed grip.

Another aspect of the console is that there are sensors on the movable screen that detect the position of a player's hand. The user interface portion of the touch screen (e.g., the virtual buttons) is then shifted up, down, or to the other side of the screen to match the placement of the player's hand for maximum comfort to the player. The user interface portion may also appear on both sides of the screen and/or on the bottom for controlling different functions. The player my make a wiping motion with her thumb on the user interface portion to spin virtual reels, for example.

Another aspect of the console is that there are position sensors (e.g., accelerometers) on the movable screen that detect the position (including angle) of the screen itself for controlling the game. In one embodiment, the physical movement of the screen by the player is detected and provides a control input for playing the game or making a selection. For example, the player may tilt the screen to control the path of a displayed rolling ball during a bonus game.

If a game entails turning, such as a steering game, the screen may be connected to the housing to allow it to turn clockwise and counter-clockwise. The video image may, in turn, be changed by detecting the angle of the screen to keep the image level.

The screen (or its frame) may have buttons (physical or virtual/capacitive) on the back surface of the screen for pressing by the player's fingers when gripping the screen to play the game or make other selections. This allows the player to firmly hold the screen with two hands while pressing the buttons in the back of the screen with any of the player's fingers and pressing the buttons on the front of the screen with the player's thumbs, while moving the screen itself to control a game. The buttons on the back of the screen may control a displayed object to move left, right, up, or down, or can be used to select an option such as to shoot, etc. A thumb swipe area on the front of the screen may be used to control other functions, such as spinning virtual reels.

Another aspect of the console is that the movable screen may include optical sensors (e.g., a camera) that detect the position of the player's head or eye movement relative to the screen. The video content may then be automatically adjusted depending on this relative angle. By following the motion of the eyes, the program will be able to display the content at the correct position. The video content may also be scalable (zoomable) to allow the player to better see portions of the display.

The screen may include a vibrator for providing tactile feedback to the player or to simulate an action in the game, such as a gunshot.

The screen may be easily detachable for replacement due to any wear and tear from being physically handled by the players.

The screen may also have input ports or output ports for external devices.

Another aspect of the console is that there is at least one fixed flat panel display screen above the movable screen. Images on the movable screen may be shifted to the fixed screen, and vice versa, for playing a certain type of game. The fixed screens may be larger than the movable screen. The fixed screens may display any information, including the pay table, artwork for the game, a bonus game, or the base game.

Other embodiments of the gaming cabinet are disclosed.

DETAILED DESCRIPTION

Figure 1:
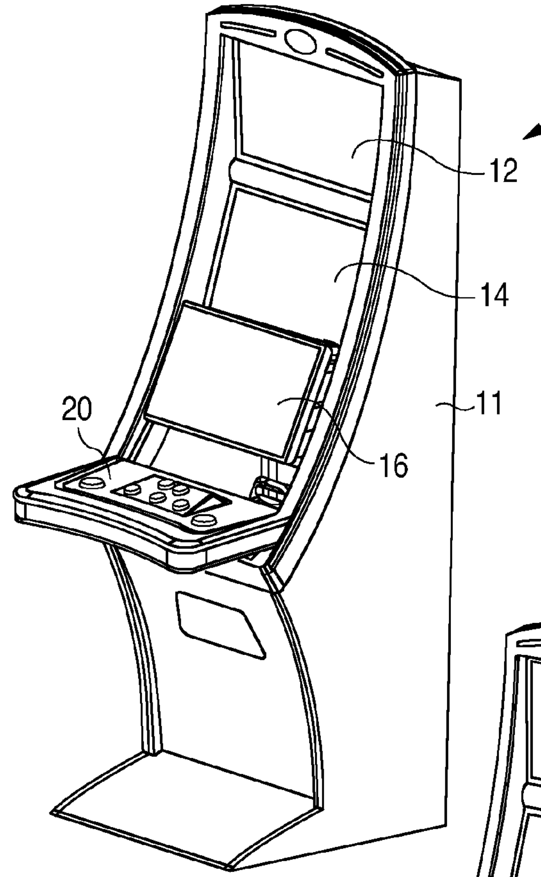
FIG. 1 is a right side perspective view of a gaming console in accordance with one embodiment of the invention, with the movable screen in a back position.

FIG. 1 illustrates a gaming console 10 in accordance with one embodiment of the invention. The console 10 allows a player to sit in a chair while playing. The console 10 comprises a housing 11, the various electronics and input/output devices used to carry out a game, and the one or more display screens used to display the game.

A top display 12 will typically identify the theme of the game. The top display 12 may be painted glass or a flat panel display screen.

A central display screen 14 is a flat panel display screen, such as an LCD screen, and may display information about the game, such as the values of various symbols and combinations, bet amounts, payouts, game rules, etc. The central display screen 14 may even display portions of the base game itself or bonus games. In one embodiment, discussed later, the image on a movable screen 16 can be shifted to the central display screen 14.

Figure 2:
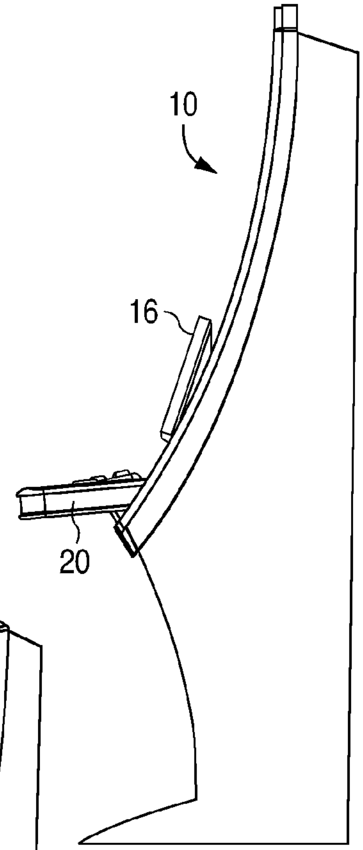
FIG. 2 is a right side view of the gaming console with the movable screen slightly tilted forward by the player.
Figure 3:
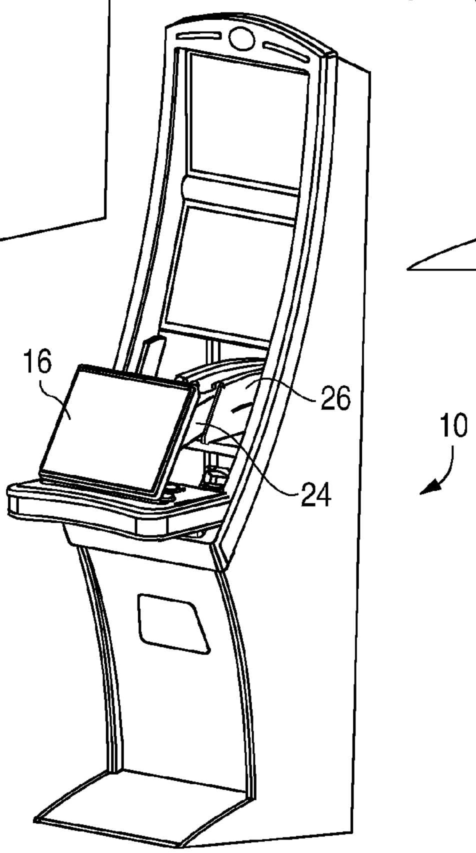
FIG. 3 is a right side perspective view of the gaming console with the movable screen moved to a forward position by the player.
Figure 4:
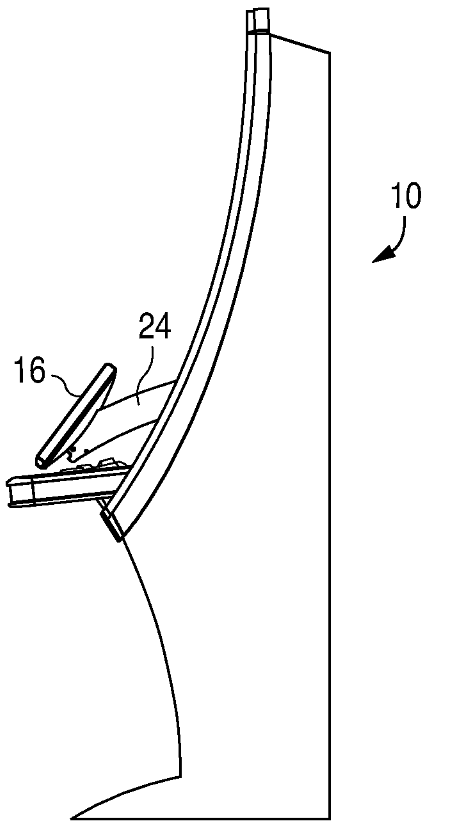
FIG. 4 is a right side view of the gaming console with the movable screen in a forward position and tilted a maximum amount upward.
Figure 5:
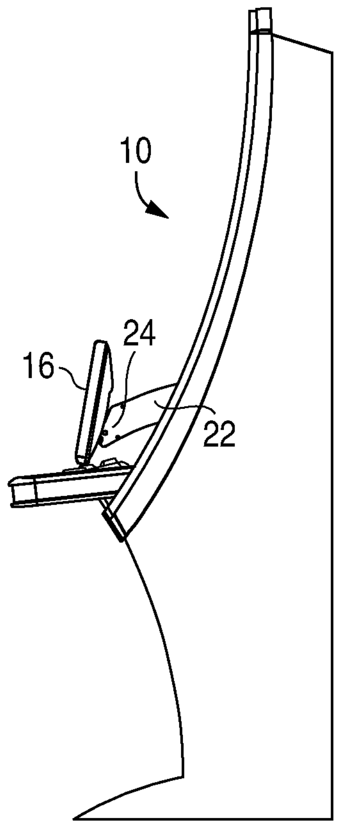
FIG. 5 is a right side view of the gaming console with the movable screen in a forward position and tilted slightly upward.

The movable screen 16 is shown in a back position. FIGS. 2-5 show the screen 16 in various other positions. FIG. 2 shows the screen 16 slightly tilted upright. FIG. 3 shows the screen 16 in a forward position. FIG. 4 shows the screen 16 tilted upward and in a forward position. And FIG. 5 shows the screen 16 substantially vertical and in a forward position. Any screen 16 position within the extremes of the various illustrated positions is also possible.

The screen 16 can be tilted up, down, left, or right, and the screen 16 can be extended out almost to the end of a control panel 20 for accommodating the position and size of any player. In another embodiment, the height of the screen 16 is also adjustable. The tilt position of the screen 16 is set by the player so the surface of the screen 16 directly faces the player's eyes for maximum contrast and brightness. The forward position of the screen 16 optimally accommodates the player's arm length when the player grips the sides of the screen 16 for controlling the game, described below.

The control panel 20 contains conventional buttons (e.g., bet buttons, start button, cash out, etc.), a bill/coin validator, card readers, and other controls used to initiate and play the game.

FIGS. 3 and 5 best show the mechanism supporting the screen 16. The screen 16 is supported at a pivot point 22 (FIG. 5) that allows the screen 16 to tilt up or down. In another embodiment, the screen 16 is connected via a ball and socket to provide a fully pivotable angle of the screen 16. The screen 16 is pivotally connected to a slidable bracket 24 (FIG. 3) that slides in and out of a stationary support channel 26. There is little resistance to the movement of the screen 16 since it is intended to be virtually constantly moved as the player is grasping the screen 16.

In another embodiment, an arm with hinges or other support mechanism is used to allow the screen 16 to be moved forward and backward.

Figure 6:
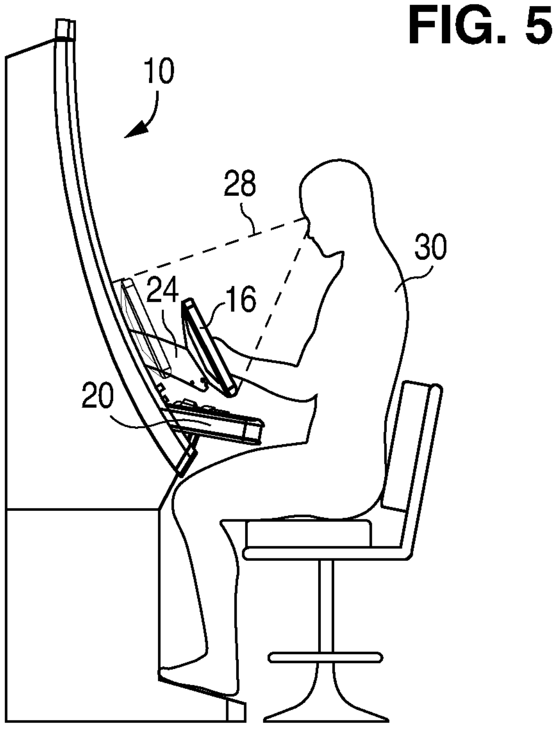
FIG. 6 illustrates a player at the gaming console viewing the movable screen, the screen detecting the player's movement of the screen, and the screen sensors detecting the position of the player's head and hands, while the player is playing a game.

FIG. 6 illustrates a player's field of view 28. The player 30 is grasping the edges of the screen 16 with both hands (the player's hands are shown transparent around the edges of the screen 16). The player 30 has adjusted the tilt angle of the screen 16 so that the screen surface directly faces the player's face for maximum contrast and brightness. The forward position of the screen 16 is adjusted by the player to obtain a comfortable arm position. The player 30 may change the positions of the screen 16 during the game for maximum comfort.

Figure 7:
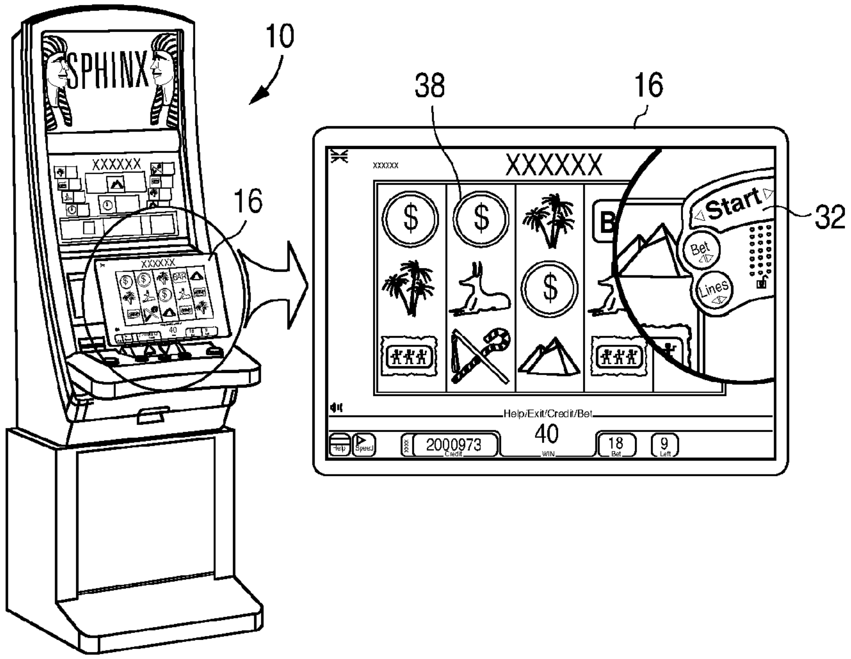
FIG. 7 illustrates the movable user interface portion of the touch screen for being controlled by the player's thumb.
Figure 8:
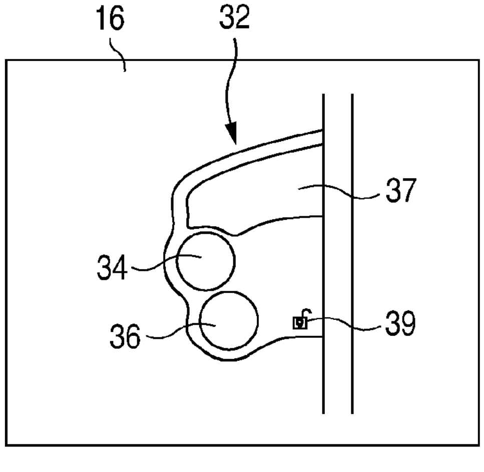
FIG. 8 is a close-up of the user interface portion.

FIGS. 7 and 8 are close-ups of an example of an image on the screen 16, showing a portion of the touch screen user interface 32. The screen 16 displays icons signifying virtual buttons or other controls, and the touch screen senses the player's touch position (typically capacitively) to generate control signals for the gaming machine's CPU. The player grasps the screen 16 with her thumbs touching the front of the screen 16 and her fingers touching the back of the screen 16. The back of the screen 16 has up to four buttons per hand for pressing by the player's fingers. The buttons on the back of the screen 16 may also be capacitively controlled. The screen 16 may contain a vibrator or piezoelectric element for providing tactile feedback when the player presses a button and/or for conveying an aspect of the game, such as shooting.

In FIGS. 7 and 8, the user interface 32 is shown having a bet amount button 34 and a lines-bet button 36 controlled by the player's right thumb. The top portion 37 of the user interface 32 allows the player to swipe her thumb from left to right to spin the virtual reels 38 once a bet has been made. The top portion 37 may instead be a virtual button to start the reels 38 spinning. Other functions may be performed by swiping a thumb over any of the buttons. For example, touching the bet amount button 34 may open a bet selection window, while sliding the thumb over the bet amount button 34 may select one of the bet options. Similar controls may be performed with the lines-bet button 36. During a game, another user interface 32 may appear on the left side of the screen 16 to allow the player to control the game with her left and right thumbs. A lock symbol 39 may be used to indicate that the player has locked the position of the user interface 32 in place during the game.

In one embodiment, the game played on the game console 10 is a virtually reels game where a plurality of virtual reels spin and randomly stop. Winning combinations of symbols across a pay line pay an amount to the player. Accordingly, the console 10 may have inputs for wagers and an output for coins or coupons. Bonus games may also be played that are interactive and may involve the player controlling the movement of the screen 16 and pressing buttons to play the bonus game.

Figure 9:
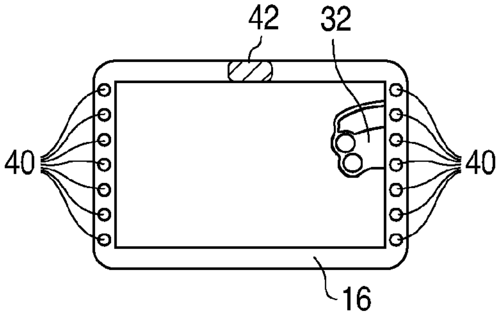
FIG. 9 illustrates sensors on/in the screen for detecting the position of the player's hands and/or position of the player's head and eye movement. Sensors in the screen also detect movement of the screen.

FIG. 9 illustrates optical sensors 40 on the front of the screen 16 for detecting the position of the player's hands. This allows the user interface 32 to automatically shift positions to match the position of the player's thumb. The player may disable the sensors 40 to lock in the position of the user interface 32.

In another embodiment, the optical sensors 40, or additional optical sensors such as a camera, also detect the position of the player's head and eye movement. Such detection may be used to control what is displayed on the screen 16 and other parameters, such as the phases of the audio to create the illusion of three-dimensional sound. The gaming console 10 is equipped with stereo speakers. Further, the video content may be automatically adjusted depending on the detected viewing angle. By following the motion of the eyes, the program will be able to display the content at the correct position. The video content may also be scalable (zoomable) to allow the player to better see portions of the display.

One or more motion sensors 42 (e.g., accelerometers) in the screen 16 detect movement of the screen 16 to allow the player to control the game itself such as by controlling the movement of a displayed ball, the aiming of a gun, or any other feature of the game. Such motion sensors for controlling a game played on a smart phone are well known; however, such motion sensors have not been used to control a game played in a gaming machine by moving a video screen. The player may tilt the screen 16, shake the screen 16, or push the screen 16 in and out to control aspects of the game, such as the movement of an avatar or object on the screen 16.

If a game entails turning, such as a steering game, the screen 16 may be connected to the housing 11 to allow it to turn clockwise and counter-clockwise. A ball and socket pivot point would be suitable for supporting the screen 16. The video image may, in turn, be changed by detecting the angle of the screen to keep the image level.

The numeral 42 may also indicate a vibrator for providing tactile feedback to the player for operating a control button or for signifying an action in a game.

Figure 10:
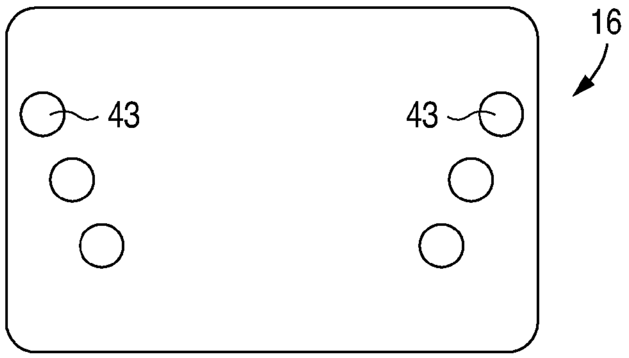
FIG. 10 illustrates the back of the screen having buttons controlled by the player's fingers while gripping the screen with both hands.

FIG. 10 illustrates the back of the screen 16 having buttons 43 controlled by the player's fingers while gripping the screen 16 with both hands. The buttons 43 may control any aspect of the game, including setting up the game or playing the game.

Figure 11:
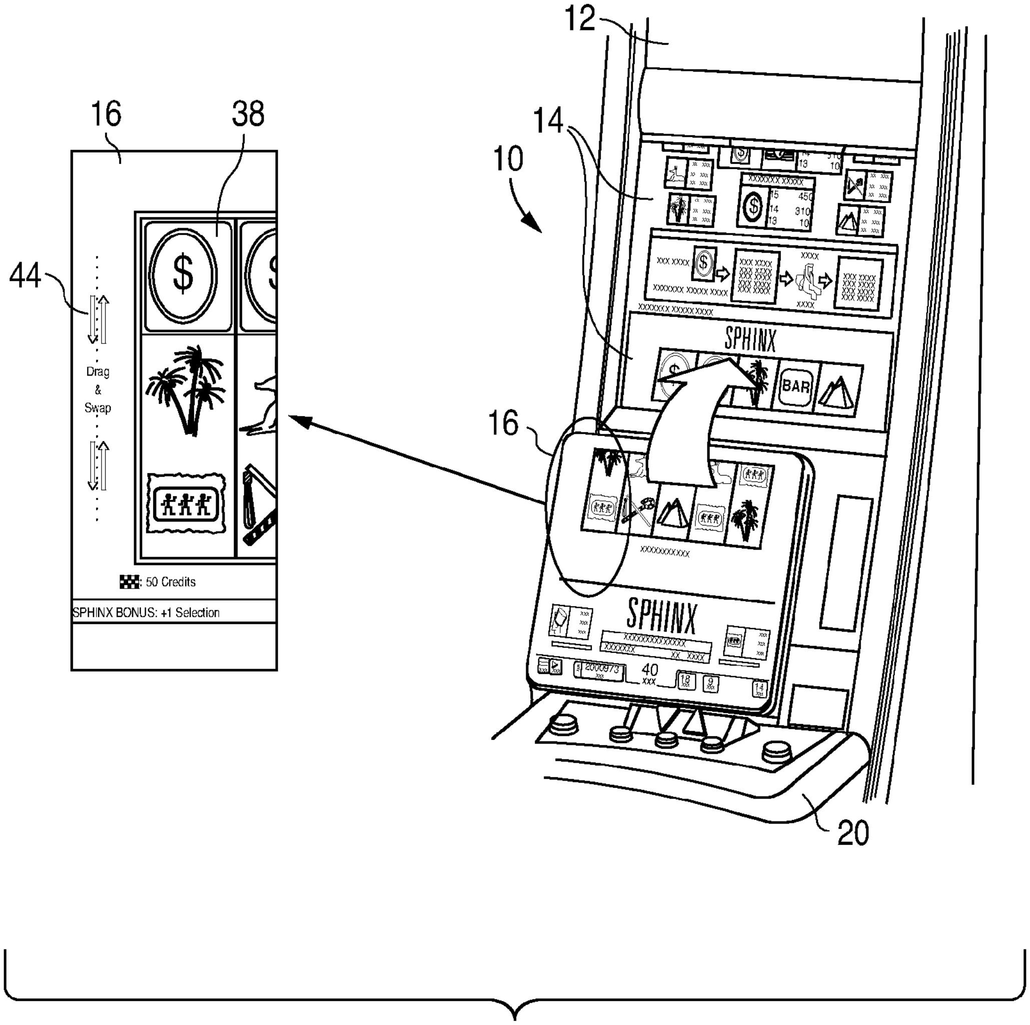
FIG. 11 illustrates the shifting of images between the movable screen and a fixed screen.

FIG. 11 illustrates a drag-and-swap user interface 44 on the screen 16 that allows the player to swipe the interface 44 upward by the player's thumb to shift the image on the screen 16 to the central display screen 14 for saving the display while another display appears on the screen 16 during a game. Or, the player may swipe the interface 44 downward to shift the image on the central display screen 14 to the screen 16. This enables various new possibilities and complexities of bonus games or base games.

The screen may be easily detachable for replacement due to any wear and tear from being physically handled by the players.

The screen may also have input ports or output ports for external devices.

In another embodiment, the movable screen 16 is curved to have the curvature of mechanical reels. Other types of curves are also possible.

The screen 16, with all of its built-in control input and output devices, allows a player to completely control a game, including wagering and carrying out the game, without releasing the screen 16 from the player's two-handed grip. This greatly reduces the physical requirements of the player, allowing the player to play an extended time. Also, by gripping the screen 16, the player may rest her arms in a comfortable manner since the position of the screen 16 is adjustable. As an added benefit, the handling of the screen 16 allows the player to release any tension that may develop during the course of a game.

Figure 12:
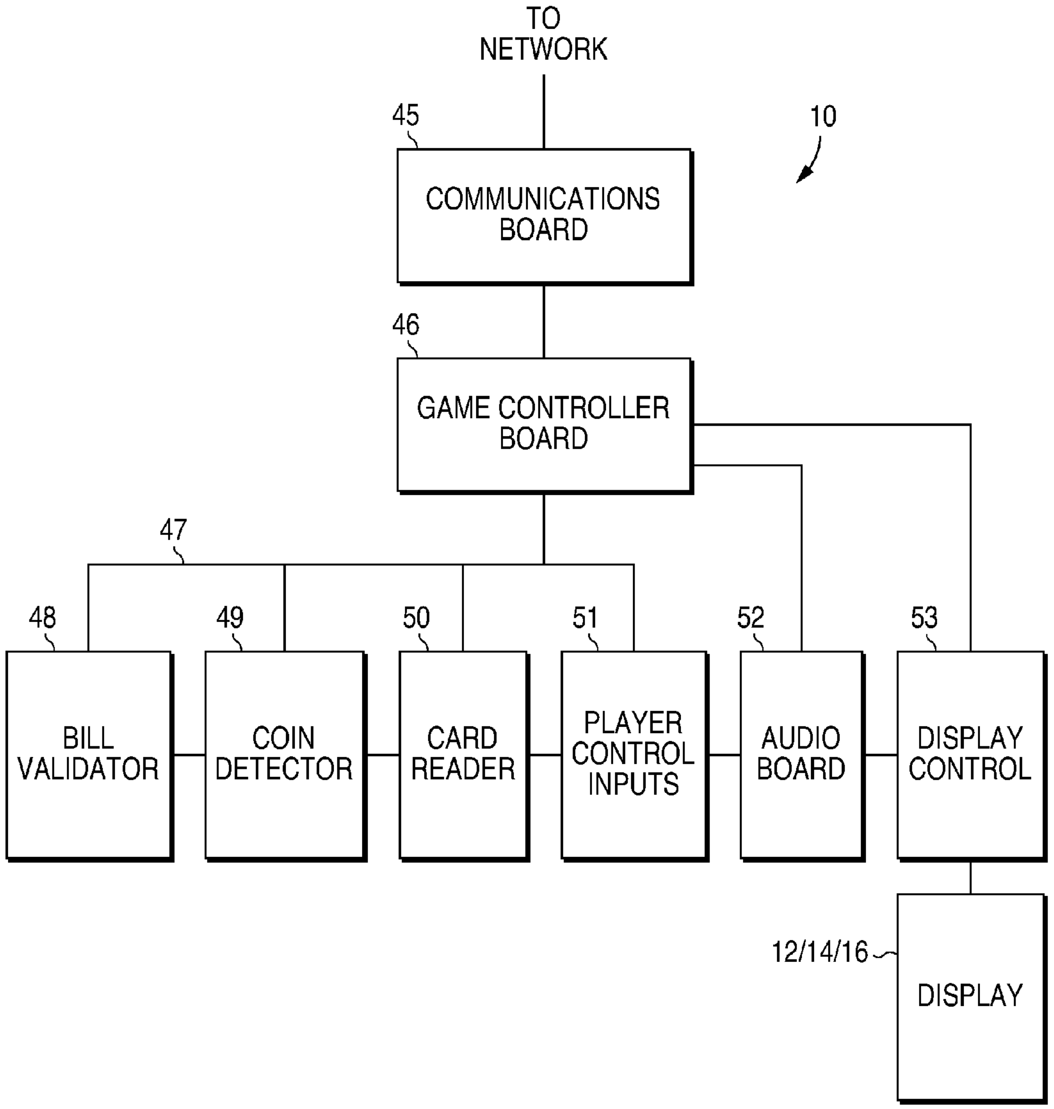
FIG. 12 illustrates various functional blocks in the gaming console used to control the game and the displays.

FIG. 12 illustrates various functional blocks in the gaming console 10 used to control the game and the displays. The gaming console 10 may use conventional electrical hardware. A communications board 45 may contain conventional circuitry for coupling the gaming console 10 to a local area network (LAN) or other type of network using Ethernet or any other protocol. The communications board 45 transmits using a wireless transmitter, or it may be directly connected to a network running throughout the casino floor. The communications board 45 basically sets up a communication link with a network server and buffers data between the network and the game controller board 46.

The communications board 45, in one embodiment, also allows communications between gaming machines. In such a case, the gaming machines may communicate with each other directly or use the casino's central server (or other server) as an intermediary.

The game controller board 46 contains memory and a processor for carrying out programs stored in the memory and for providing the information requested by the network. The game controller board 46 carries out the game routine, including carrying out any command from the network.

Peripheral devices/boards communicate with the game controller board 46 via a bus 47 using, for example, an RS-232 interface. Such peripherals may include a bill validator 48, a coin detector 49, a smart card reader or other type of credit card reader 50, and player control inputs 51 (such as the various buttons, motion detector, and touch screen). An audio board 52 converts coded signals into analog signals for driving speakers. A display controller 53, which typically requires a high data transfer rate, converts coded signals to pixel signals for the various display screens. Display controller 53 and audio board 52 may be directly connected to parallel ports on the game controller board 46.

The electronics on the various boards may be combined onto a single board.

The term gaming machine, as used herein, includes any computer device that is a dedicated gaming machine, or any computing device that has multiple uses but is temporarily configured as a gaming device. If the gaming machine is a dedicated machine for wagering, the machine will typically include a means for accepting wagers and dispensing awards or coupons. The screen 16 in the gaming console 10 may be part of a general purpose computer system that is programmed to carry out a gaming program. In one embodiment, the amusement game is not a gambling type game but is a non-gambling video game, such as where the player controls a car or characters on the screen.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A gaming machine comprising:

a housing;

a movable video screen; and a support mechanism for the screen connected to the housing, the support mechanism allowing the screen to at least be tilted up and down by a player as well as moved forward and backward by the player, wherein a center portion of the screen is located below the player's head, requiring the player to look down on the screen, wherein the screen is adapted to be gripped on its lateral sides by the player during active play of the gaming machine, wherein the screen is a touch screen, the screen displaying a touch screen user interface operable by a player's thumb when gripping the screen, the user interface comprising at least one control icon being located proximate a lateral side of the screen, the at least one control icon being positioned to coincide with a position of the player's thumb when gripping the screen during play of the gaming machine, wherein the at least one control icon is fixed in position irrespective of a position of the player's hand over the screen while playing a game, wherein the at least one control icon includes at least a game start control icon, wherein the at least one control icon is located to enable the player to play a plurality of games by touching at least the game start control icon with the player's thumb without the player having to reposition the player's grip while gripping the screen, wherein the at least one control icon is positioned so as not to interfere with the game.

2. The machine of claim 1 wherein the machine further comprising at least one motion sensor coupled to the screen, the at least one motion sensor sensing movement of the screen by the player and supplying corresponding control signals to control a game being carried out by the gaming machine.

3. The machine of claim 1 wherein the support mechanism comprises:

a pivoting portion connected to the screen to allow the player to tilt the screen up and down; and a slidable member connected to the screen that allows the player to move the screen toward the player and away from the player.

4. The machine of claim 1 further comprising control devices on a back surface of the screen to allow the player to manipulate the control devices with the player's fingers while gripping the screen to control aspects of a game.

5. The machine of claim 1 further comprising optical sensors in the screen for sensing a position of the player's hand on the screen and shifting a position of a touch screen user interface displayed on the screen to substantially align with a position of the player's thumb when gripping the screen.

6. The machine of claim 1 further comprising a fixed screen.

7. The machine of claim 6 further comprising a user interface that allows the player to shift at least a portion of an image displayed on the movable video screen to the fixed screen.

8. The machine of claim 1 further comprising a user interface displayed on the screen that allows the player to swipe the player's thumb across the user interface to signify an action to be taken by the machine when controlling an aspect of a game.

9. The machine of claim 1 further comprising at least one optical sensor coupled to the screen for detecting a position of the player's head to control aspects of a game.

10. The machine of claim 1 further comprising a vibrator coupled to the screen for providing tactile sensations to the player.

11. The machine of claim 1 wherein the gaming machine carries out a wagering game in which monetary awards are granted.

12. A method performed while playing a game on a gaming machine, the method comprising:

a player moving a video screen, attached to a housing of the gaming machine by at least a movable support member, by tilting the screen and moving the screen a desired distance away from the player, wherein a center portion of the screen is located below the player's head, requiring the player to look down on the screen;

the player gripping the screen on its lateral sides during active play of the gaming machine;

the player also moving the screen during playing a game on the gaming machine, the movement being electrically detected to control aspects of the game, the screen containing one or more position sensors that detect a position of the screen, wherein a position of the screen controls the aspects of the game; and the player touching portions of the screen to make game selections.

13. A method performed by a gaming machine comprising:

a video screen attached to a console of the gaming machine being gripped by a player on its lateral sides during active play of the gaming machine, wherein a center portion of the screen is located below the player's head, requiring the player to look down on the screen;

detecting movement of a video screen by a player moving the screen and generating corresponding control signals, the screen being movably attached to a housing of the gaming machine; the screen containing one or more position sensors that detect a position of the screen, wherein a position of the screen controls the aspects of the game;

using the control signals, by a game controller, to control a game being played on the screen; and sensing user interface signals, by the game controller, by a player touching areas of the screen for controlling aspects of the game.

14. The method of claim 13 wherein the step of detecting movement of the video screen comprises detecting movement by the player gripping the screen with both hands and moving the screen.

15. The method of claim 13 wherein the step of sensing user interface signals comprising the player touching touch screen icons with the player's thumb when gripping the screen.

16. The method of claim 13 wherein the step of detecting movement of the video screen comprises detecting movement with an accelerometer.

17. The method of claim 13 wherein the step of sensing user interface signals comprises the player touching touch screen icons with the player's thumb when gripping the screen, the method further comprising:

sensing a position of the player's hand when gripping the screen, and automatically shifting the touch screen icons to a position where the player's thumb is located over the screen.

18. The method of claim 13 further comprising providing tactile sensations to the player during a game by a vibrator coupled to the screen.

19. The method of claim 13 wherein the gaming machine further comprises a fixed screen, the method further comprising allowing the player to shift an image from the movable video screen to the fixed screen.

* * * * *